(12) United States Patent
Konnola et al.

(10) Patent No.: US 9,484,006 B2
(45) Date of Patent: Nov. 1, 2016

(54) MANIPULATION OF TEXTUAL CONTENT DATA FOR LAYERED PRESENTATION

(71) Applicant: Documill Oy, Espoo (FI)

(72) Inventors: Mika Konnola, Espoo (FI); Rami Hanninen, Espoo (FI); Terho Laakso, Espoo (FI)

(73) Assignee: DOCUMILL OY, Espoo (FI)

( * ) Notice: Subject to any disclaimer, the term of this patent is extended or adjusted under 35 U.S.C. 154(b) by 319 days.

(21) Appl. No.: 13/765,860

(22) Filed: Feb. 13, 2013

(65) Prior Publication Data

US 2014/0225928 A1    Aug. 14, 2014

(51) Int. Cl.
*G06F 17/21*    (2006.01)
*G09G 5/40*     (2006.01)
*G06F 17/30*    (2006.01)
*G06T 11/60*    (2006.01)

(52) U.S. Cl.
CPC .............. *G09G 5/40* (2013.01); *G06F 17/214* (2013.01); *G06F 17/30899* (2013.01); *G06T 11/60* (2013.01)

(58) Field of Classification Search
CPC ....................................................... G09G 5/40
See application file for complete search history.

(56) References Cited

U.S. PATENT DOCUMENTS

| | | | | |
|---|---|---|---|---|
| 8,910,041 | B1* | 12/2014 | Buryak et al. | 715/269 |
| 2006/0288278 | A1* | 12/2006 | Kobayashi | 715/523 |
| 2007/0074109 | A1* | 3/2007 | Nagahara et al. | 715/517 |
| 2008/0266326 | A1* | 10/2008 | Porwal | 345/659 |
| 2010/0315431 | A1* | 12/2010 | Smith et al. | 345/619 |
| 2011/0258535 | A1* | 10/2011 | Adler et al. | 715/235 |

\* cited by examiner

*Primary Examiner* — Kee M Tung
*Assistant Examiner* — Nicholas R Wilson
(74) *Attorney, Agent, or Firm* — Young & Thompson

(57) ABSTRACT

A method for creating visual content to be output in a layered manner, wherein content items are received, and are categorized into at least two categories. At least one of the categories includes at least one image content item and at least one other category includes at least one textual content item. The content items in each of the categories are manipulated, wherein the textual content data is manipulated with at least one operation applicable for textual content and the manipulation produces at least one data file including textual content data for the text layer to be prepared for outputting in a client device. Finally, data files including manipulated image content data and the manipulated textual content data are stored. A system, a computer program product, a method in the client device and the client device are also described.

22 Claims, 3 Drawing Sheets

MANIPULATION OF TEXTUAL CONTENT DATA FOR LAYERED PRESENTATION

TECHNICAL FIELD

The invention concerns in general the technical field of content manipulation in computer graphics. Especially the invention concerns manipulation of different content types in a different manner for a layered presentation.

BACKGROUND OF THE INVENTION

The digitalization of information has resulted in a development of ways for storing and visualizing graphical information. The storing and visualization of graphical information i.e. images in a two dimensional space is based on two main types of graphical information, the first of which is called vector graphics and the second of which is called raster graphics (also known as bitmap).

The vector graphics is a type of computer graphics, which is based on an idea in which objects are tied into coordinates. The objects are for example lines, polygons, circles and other geometrical shapes. The characteristics and shapes of the objects are described as coordinates and mathematical expressions, such as mathematical formulas. For example, if a circle is to be created with vector graphics, an indication that a circle is to be created is needed, a location of the center of the circle in a coordinate system is defined as well as the radius of the circle. Additionally, the line style and a color and a fill style and a color are to be defined in the formula. By modifying the values in the formula the object can be re-shaped. Images based on the vector graphics are well-suited for showing ordered, exact and constructed items like text and diagrams. The images expressed with the means of vector graphics are called vector images.

In the raster graphics, in turn, the graphical information is expressed as a regular grid of colored points. More specifically, the raster image is composed from picture elements i.e. pixels, which are arranged in a grid structure, which is typically a rectangle. Each picture element has a predefined location in the grid and the color of the picture element is defined with color values. A raster image expressed as an array of data where each point occupies one array element is called an uncompressed raster image. The main benefit of this representation is that each point in the raster can be directly accessed by accessing the corresponding array element. The main drawback is that when that array is stored or transferred, the amount of raw data to be handled may be too much for the corresponding medium. The manipulation of the raster graphics image is possible in multiple ways, e.g. by adding or removing the picture elements to or from the image or optimizing the characteristics of the picture elements according to the needs. By means of the manipulation it is possible to affect the size of the image i.e. how much memory space is needed in storing the image data. Generally speaking, raster images are well-suited for showing disordered, approximate, and natural items like landscapes and physical objects typically originating from photos or scans.

Both image types are used in storing and visualizing of graphical information. The vast majority of modern display devices are so called raster displays that show a regular grid of colored points. Although the arrangement and shape of these points vary, the concepts of density and resolution that apply to raster images apply directly to raster display devices, too. Raster displays can display both vector and raster graphics, but the process required doing so is different. The process of displaying vector graphics on a raster display is called scan line conversion. It resolves where freeform vector graphic shapes intersect with raster display points arranged into straight lines, and what the color at each such intersection point is. The process of displaying raster graphics on a raster display is called raster resampling. It resolves which colors to apply on each raster display point by interpolating the colors between the colors at neighboring raster image points. An important resampling special case is when raster image and raster display resolution and point arrangement match perfectly. Resampling operation is then reduced to a simple copying operation.

In order to display any visual content on screens of computing devices, or to store it into a bitmap image file, the content goes thru scan line conversion (vector graphics) or raster resampling (raster graphics) steps, as disclosed above. These steps transform visual content so that they can be rasterized into the raster canvas having a certain pixel density (resolution). With the term 'raster canvas' it is meant a raster image kept and maintained in uncompressed form in a memory of a computing unit, such as a computer. The visual contents in the raster canvas can then be displayed on screen, or stored into a bitmap image file. When storing the data into some memory structure or a file, different data compression schemes may be applied to optimize the resulting bitmap image file size. There are various ways to compress bitmap data, and thus influence quality/size ratio of the resulting bitmap image file. It is often desirable to minimize the image file size, just to make it more affordable and practical to store, or to transmit to some remote device. The time it takes to transmit a file is dependent on the file size, and in slow network connections like mobile networks, this has direct impact on the overall user experience—how long the user needs to wait in order to see a certain image file.

A further aspect is that the modern outputting of graphical content is based, at least in some application areas, on layered visualization meaning that two or more content layers are superposed onto each other in a predetermined order so that the desired visual effect can be achieved. At least some of the layers are at least partially transparent in order to enable the visualization of content from the lower layers. In practice this means that several image content items are received, which are categorized under predetermined rules, such as based on the type of the image content item, into separate categories. The image content items in the categories are then rendered into raster canvases, which then form image content data in each of the categories. The image content data in each raster canvas may be compressed with applicable compression method resulting compressed image content data, which is stored in a data file, such as in a bitmap image file. The content data in the data file can be output in a layered manner by superposing the decompressed content data in each of the files belonging to the same visual output to be displayed.

A common example of the layered visualization is that text content is to be superposed on an image layer. One way to do this is to transform text objects into drawing instructions, and then further transform those drawing instructions into HTML content, and then position that HTML content on top of the image layer. A technique called web fonts can be used to force a certain downloadable font to be used when displaying HTML transformed text object. This approach has several shortcomings. For example, as the text objects are manipulated in a form of drawing instructions, which get transformed into HTML, any possible logical structure in the original text object is lost. In fact, a text object may be just one character, a word and half, or some mixture of characters belonging to different words, sentences and paragraphs. When all the text objects are displayed simultaneously, human reader sees them as full, meaningful phrases and sentences. For the computer displaying such layered construct these characters are meaningless, and due to the lack of structure, they cannot be processed or manipulated effectively as HTML content. Secondly, if such text objects are transformed to HTML without any optimization, the resulting text layer defined using HTML will have a lot of redundant information related to text formatting, thereby making it impractical to transfer or use in situations which deal with large volumes of text objects in same logical area, like a document page.

Another challenge with the existing methods arises from the fact that outputting the content data in a layered manner is more and more happening on a display of a client device, such as a personal computer or a mobile terminal. The development of the displays, e.g. high-resolution displays, as well as requirement of on-device zoomability of the content puts the requirements for content data manipulation on a totally new level.

Therefore, it is necessary to define an approach, which allows displaying content while relying on selective rasterization of content both on the server side and with the client device. In practice, as client devices, and the software applications residing in the client devices, may differ from each other, this approach may cause some content to be displayed in a different manner depending on the client device used.

SUMMARY OF THE INVENTION

An objective of the invention is to present methods and a system and a computer program code and a client device for creating visual content to be displayed in a layered manner. Another objective of the invention is that the methods and the system and the computer program code stored in computer readable medium and the client device provide tools for manipulating content items in a different manner based on the type of the content items.

The objects of the invention are reached by methods, a system, a computer program code stored in computer readable medium and a client device as defined by the respective independent claims.

Various examples of methods and systems for creating visual content to be displayed are described.

According to a first aspect, a computer implemented method for creating visual content to be output in a layered manner is provided. The method comprises receiving at least one image content item and at least one textual content item; categorizing the received at least one image content item into at least one first category and the received at least one textual content item into a second category; manipulating the at least one image content data in the at least one first category with at least one operation applicable for image content, the image content data manipulation producing at least one data file comprising image content data for at least one image layer to be outputted in a client device; manipulating the textual content data in the second category with at least one operation applicable for textual content, the textual content data manipulation producing at least one data file comprising textual content data for the text layer to be prepared for outputting in the client device; storing the data files comprising manipulated image content data and the manipulated textual content data.

The manipulation of the textual content data may comprise a reconstruction of the textual content data to enable a further manipulation of the textual content data. The reconstruction comprises a step of combining at least two separate text objects into a single logical text entity.

The manipulation of the textual content data may comprise a step of selecting a font to be used in the text layer. For example, a font may be selected, which is received as a font data within the received textual content item. Alternatively, a font from a font pool available to the system may be selected, which is the same as the font used in the received textual content item. A still further option may be to select a most similar font to the font used in the received textual content item from a font pool available to the system.

The manipulation of the textual content data may comprise a step of creating multiple web font files for different application software outputting the textual content data.

A text content item with additional effects may be categorized into the first category and manipulated along the image content data.

According to a second aspect, a system for creating visual content to be output in a layered manner is provided. The system comprises one or more processors and a memory including computer program code, wherein the memory and the computer program code are configured to, with the processor, cause the system at least to perform the following: receive at least one image content item and at least one textual content item; categorize the received at least one image content item into at least one first category and the received at least one textual content item into a second category; manipulate the at least one image content data in the at least one first category with at least one operation applicable for image content, the image content data manipulation producing at least one data file comprising image content data for at least one image layer to be outputted in a client device; manipulate the textual content data in the second category with at least one operation applicable for textual content, the textual content data manipulation producing at least one data file comprising textual content data for the text layer to be prepared for outputting in the client device; and store the data files comprising manipulated image content data and the manipulated textual content data in the memory.

The system may be configured to reconstruct the textual content data to enable a further manipulation of the textual content data. The reconstruction may comprise a step of combining at least two separate text objects into a single logical entity.

The system may be configured to select a font to be used in the text layer in the manipulation of the textual content data. The system may be configured to select a font, which is received as a font data within the received textual content item. Alternatively the system is configured to select a font from a font pool available to the system, which is the same as the font used in the received textual content item. A further option is that the system may be configured to select a most similar font to the font used in the received textual content item from a font pool available to the system.

The system may be configured to create multiple web font files for different application software outputting the textual content data in the manipulation of the textual content data.

The system may be configured to categorize a text content item with additional effects into the first category and manipulated along the image content data.

According to a third aspect, a computer-readable storage medium storing portions of computer program code is provided, wherein the portions of computer program code are computer-executable to implement the method for creating visual content to be output in a layered manner as described.

According to a fourth aspect, a method for creating visual content to be output in a layered manner in a client device is provided. The method comprises receiving image content data prepared in a system; receiving textual content data files prepared in the system; rendering the received textual content data files at least partly based on hardware characteristics of the client device; outputting the received image content data and the rendered textual content data in layered manner on a display of the client device, wherein the text content data is topmost.

The textual content data may be re-rendered in response to a detection of a change in display orientation of the client device.

According to a fifth aspect, a client device for creating visual content to be output in a layered manner in the client device is provided. The client device comprises one or more processors and a memory including computer program code, wherein the memory and the computer program code configured to, with the processor, cause the client device at least to perform the following: receive image content data prepared in a system; receive textual content data files prepared in the system; render the received textual content data files at least partly on a basis of hardware characteristics of the client device; output the received image content data and the rendered textual content data in layered manner on a display of the client device, wherein the text content data is topmost.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

Figure 1:
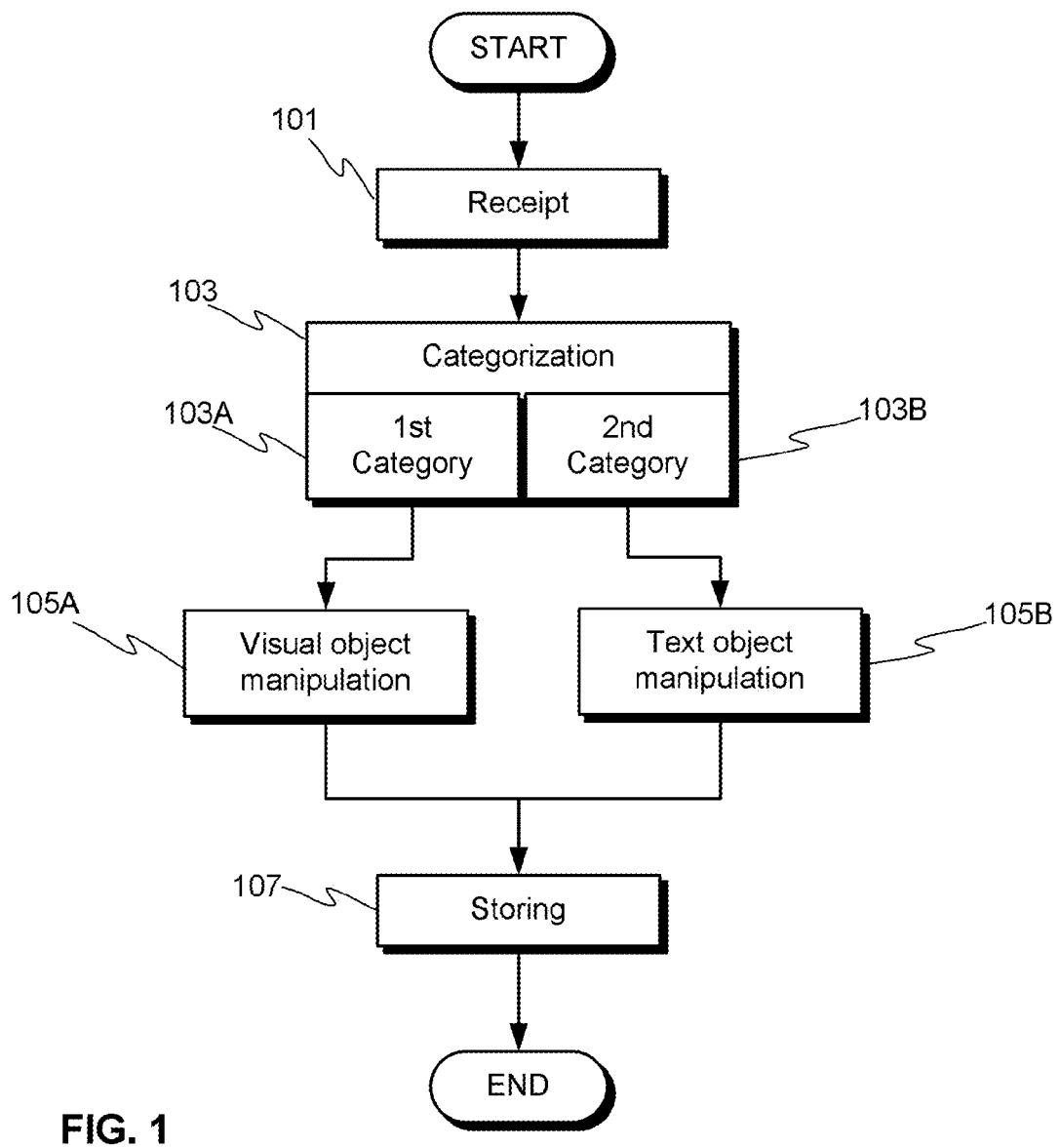
FIG. 1 illustrates an example of the method according to the invention.

An example of a method according to the invention is illustrated in FIG. 1. In the computer implemented method one or more documents are received 101 in a processing entity as a file or as a data stream. The received one or more documents comprise content items, which refer here to any graphical data object, such as image, text or similar, which is configured to be included in the final graphical presentation with necessary manipulation, if any, to the data. The receipt of content items covers also any retrieval of the data from a predetermined location. For example, content items may be within a document containing data objects in a PDF, RTF, DOC/X or PPT/X format. For example, an object type, object characteristics, object format, object size or object compression type may be used when determining a type of the content items as will be discussed next.

The received content items are categorized 103 into two categories according to the example of the invention. The categorization is arranged so that visual objects, i.e. image content items, are arranged to a first category 103A and text objects, i.e. textual content items, are arranged to a second category 103B. A determination, if a received content item is either a visual object or a text object, is based on predetermined rules relating to identification and/or analysis of the received content item, for example. In the determination, the goal is to find text objects without any additional effects having an impact on the visualization of the object, and categorize such text objects into the second category 103B and all other objects into the first category 103A. Visual objects are, for example, bitmaps and vector objects representing other types of visual content than text. The text object, in turn, is textual content item whose visualization requires selecting suitable character shapes from separate font data. Font data is in a form of re-usable vector or bitmap objects where each text character has its own visual representation disclosed with vector or bitmap graphics and stored into a resource file called font file. The text object is typically consists of character codes created using e.g. ASCII, ISO-Latin-1 or UNICODE mapping defining characters forming the textual content of the object. The text object typically also defines which font to be used, what should be the text size, what kind of basic formatting should be applied (bold, italics, underline) and what is the location of the text object when the final output is displayed.

The image content items in the first category 103A and the textual content items in the second category 103B are configured to be manipulated in a different manner in order to provide enhanced features in the client device to manage and display the content. As the first category 103A comprises image content items defined as visual objects they are to be manipulated with visual object manipulation 105A. The visual object manipulation 105 comprises rendering of the image content data into a raster canvas. Further, an applicable compression method, i.e. approach, is selected according to the image content data in the raster canvas. An aspect in the selection is if a lossy or lossless compression approach is to be selected. If the rendered image content data comprises mainly vector graphics based content, it may be advantageous to select a lossless compression approach. On the other hand, if the rendered image content data comprises mainly photo content, it may be preferable to select a lossy compression approach. As can be seen, the compression method is to be selected at least partly on the basis of the image content data in the raster canvas. The compressed image content data from the raster canvas is configured to be stored 107 either temporarily or permanently into a file to be outputted.

During the categorization 103 a second category 103B comprising one or more text objects is also created, as described. According to the example of the invention the textual content data is manipulated with text object manipulation 105B. The text object manipulation may comprise one or more method steps by means of which the data describing the text layer of the final layered visual output can be created. In order to reach at least some objectives of the invention the text object manipulation 105B comprises defining the data needed for constructing the text layer from the text objects categorized in the second category 103B. This step consists of defining the characters needed visualizing a certain textual content, capturing the text formatting instructions into separate data structure as well as manipulating accompanying font data and storing it into suitable data structure. In case the text object does not include font data required to define exact visual presentation of the textual content data, there may also be operations by means of which a suitable font is selected to be used when displaying the textual content data. Additionally, it may be beneficial to output the textual content data as accurately as possible. Thus, the text object manipulation 105B may comprise operations to construct final textual data with so called web font technology from the textual content data categorized to be included into the text layer. The web font technology is based on the idea that enables visualization of the textual content in the outputting device with fonts that are not installed in the outputting device. As a result, the designers of the visual content are aware of, and can trust on, that the textual content is outputted as desired (i.e. the user of the device sees the content as the designer desires). In practice, this means that the required font data, i.e. visual definitions for the characters used, is delivered together with the textual content itself i.e. embedded in there. The computer software, such as a web browser, outputting the content in the client end, is configured to read the web font file and display a certain text string using the resources of the downloaded web font file. Final textual content data is configured to be stored 107 either temporarily or permanently into one or more files to be outputted. For example, the manipulation of textual content as described herein may produce multiple files to be stored, such as text layer in HTML format, definitions for the fonts to be used (e.g. CSS file) and the file or files for each different web font to be used in the final graphical presentation.

The above described computer implemented method provides many advantages. For example, when the final image content data and the final textual content data forming their own content layers are superposed so that the textual content layer is displayed on top of the image content layer, it is possible to have an high fidelity text representation, in which the textual content is rendered optimally in the client device. This enables e.g. on-device zooming of the textual content data in the viewing application as the textual content data is delivered as HTML into the viewing application, such as a web browser. This mitigates the need to download different versions of the textual content data for different screen sizes and resolutions, as the textual content data is in such a form in the client device that allows on-device rendering when needed. At the same time, the final image content data as a background layer can e.g. be resized in the client device, in other words resampled, and if needed, a new version with different resolution or size can be downloaded. All in all, the amount of data needed to be transferred between the client device and the system configured to perform at least part of the operations as described above can be decreased while maintaining high quality textual output. As the text layer is in the HTML format in the client device this also enables manipulating the textual content data in the client device. The manipulation in the client device may comprise at least cut and paste operations, ability to modify the HTML formatted textual content data stored in web browser's internal document object model (DOM) for translation and content filtering purposes, search operations and so on. These manipulations are possible as the texts for the text layer are stored in structured manner in document object model (DOM) and visualized into the final visual presentation form using the resources and capabilities available at the client device.

A further aspect with respect to the categorization 103 is that only those text objects are categorized into the second category 103B, which are not impacted by any effects intended to influence visual objects, and therefore the final graphical presentation of the image content. In other words, if a content item is a text object influenced by some advanced image processing effect, which causes visual changes to the rendition of such text object, the text object is to be categorized in the first category 103A and thus it will be rendered into the image layer. If needed the text object in question is deleted from the text layer in order to avoid any double visualization of the same text object in different layers. Examples of effects embedded in the text object are blending and partial transparency. As a result, only those text objects, which are not impacted by such effects end up to the second category 103B, which are to be manipulated as will be described.

The manipulation for the visual objects 105A as categorized comprises the rendition and compression operations. In the rendering the visual objects as well as text objects with effects, if any, are rendered into a raster canvas. In the rendering the text objects with additional effects may bring a need to re-render some already rendered visual objects in the raster canvas, or a need to delete the already rendered image content from the raster canvas in order to avoid any collision of the originally rendered image content item and the rendered text object with additional effect when outputting the content. The visual object manipulation 105A comprises also compression operation to the image content data in the raster canvas with applicable compression approach as already discussed. As a result of the visual object manipulation 105A a bitmap image file, which contains all the visual objects on an area to be visualized except the text objects, is produced, which is stored either temporarily or permanently into a file to be outputted.

Figure 2:
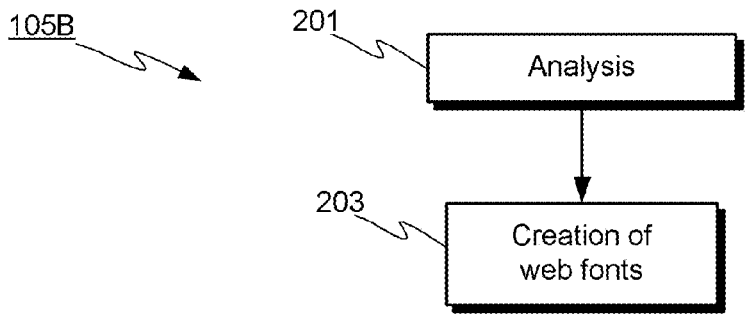
FIG. 2 illustrates an example of a method step according to the invention.

Next, the text object manipulation 105B is described in more detail. An example of the step of the text object manipulation 105B is illustrated in FIG. 2. The categorized textual content items are analyzed 201. As a result of the analysis information is received, which fonts and which characters are used in each of the textual content items and therefore needed in the following steps within the text object manipulation 105B. The analysis also reveals if a received textual content item comes with font data or not. The term font data refers to definitions of a font in order to visualize textual content using the font in question. It depends on the type of the textual content item if the visual information required to render certain text characters with certain fonts comes with, or is included in the content item or not. For example, a content item in Portable Document Format (PDF) typically comes with the sufficient font data in order to reproduce included text characters with high accuracy, but e.g. some commonly used office document formats, such as Microsoft Word binary document files (.DOC), do not include such font data. Rather than including all the required font data, those format require that the viewer of the document has the same fonts available as the creator of the document had. The mentioned document formats are only examples.

In the next step of the textual content manipulation 105B web fonts are created 203 from the textual content item in response to the outcome of the analysis 201. In case, the textual content item comes with the font data, the same font data is used for creating web fonts for the content. If the textual content item or items in question does not come with the font data, a suitable font is configured to be selected. The font selection aims to recognize the font originally used to create the text object and if the same font can be found from a font pool, perform the text object manipulation 105B with that font when creating the corresponding web font 203. The fonts in the font pool are stored in a location, such as in a network drive, which is available to and accessible for the system. If exactly the same font is not found in the system, the best replacement font in the system is configured to be selected. In other words, a font that best corresponds to the font referred to in the text object is selected, since the spatial characteristics of a text object is highly dependent of the font in use. A font that corresponds best to the font in the text object means that such a font may be selected, which comprises the most similar visual characteristics to the original font used in creating the text object. Another basis for selecting a font may e.g. be that the font includes visual definitions for the same characters as those included in the text object. For example, finding the font with the most similar visual characteristics can be achieved by comparing PANOSE values stored within font data and calculating a difference value between the original font used in creating the text object and at least two other fonts available in a font pool. The font from the font pool is to be selected, whose comparison value is the smallest compared to other comparison values. Thus, if the replacement font does not correspond enough the original font referred by the text object, it may happen that the text expressed with the replacement font does not anymore properly fit in the location it was intended to in the final graphical presentation. As the font data now exists with the text object, either received with the text object or selected as the replacement font, the creation of web fonts 203 can be continued. The creation of web fonts 203 may further comprise e.g. monitoring that the created web font follows Unicode character setting, while optimizing web fonts to contain only those characters, which are needed to display text as in the source entity, e.g. document or page. Finally, as the client devices may comprise different software applications for outputting the final graphical presentation the creation of web fonts comprises one or more operations in which different web font variants are created for different software applications. Typical examples of the software applications used for displaying the final graphical presentation are Internet browsers in the client devices. As there are several Internet browsers existing, it may be needed to create an own variant of the web fonts for each of the browsers. As a result, the text object manipulation 105B produces one or more data files comprising instructions to visualize the textual content data in the text layer. Typically, the text object manipulation 105B produces multiple data files, which together comprise instructions for visualizing the textual content. The outcome of the text object manipulation may, for example, be a HTML page for text objects, web font files and CSS file, which defines the use of web fonts in the final graphical presentation. More specifically, HTML page defines which characters and which style are used, and into which location in the page the content is to be placed. CSS file describes, which web font data and font design a certain style is using. Web font files, in turn, comprise glyphs i.e. information defining a specific shape, design, or representation of a character. There are several variants of web font file formats for different Internet browsers.

As described above the text object manipulation 105B comprises an analysis 201 of the textual content data. In some example of the invention prior to the analysis 201 the received textual content items may be reconstructed in order to prepare text objects, which, in their original form, are not suitable for the optimal processing. With additional manipulation text strings spread into different text objects can be reconstructed and thus made suitable for further manipulation. The re-construction may e.g. comprise combining at least two separate text objects into logical text entity, such as words, lines of text, sentences and/or paragraphs to be used as content for the text layer. In this manner it is possible to prepare the textual content suitable for document object based (DOM) content manipulation as well as to optimize the storage of the text layer, for instance. Without the reconstruction, especially in cases where the text objects are separate, the text layer for the final graphical presentation is scattered into small separate pieces and as a result of that it is not possible to significantly change font size and still achieve visually smooth and nice zooming experience of the textual content data when the text is rendered again according to the new zoom factor. In other words, if the text objects are not reconstructed into logical words, lines of text, sentences and/or paragraphs, changing font size for zooming purposes due to the new zoom factor will cause overlapping of the textual content and/or oversized gaps between the text objects. Generally speaking, after the reconstruction the text objects within a page form logical entities, such as words, lines of text, sentences and/or paragraphs, which can be manipulated as entities, and the manipulation itself does not cause any undesired result for the textual content data when outputted.

The primary goal of the text object manipulation 105B, among others, is to produce textual content data for text layer, which corresponds to the original content as closely as possible. Additionally, the text object manipulation 105B produces such content, which can be outputted with multiple software applications in the client device, and at the same time enables client-side document object based (DOM) content manipulation capabilities over the state of the art solutions.

Figure 3:
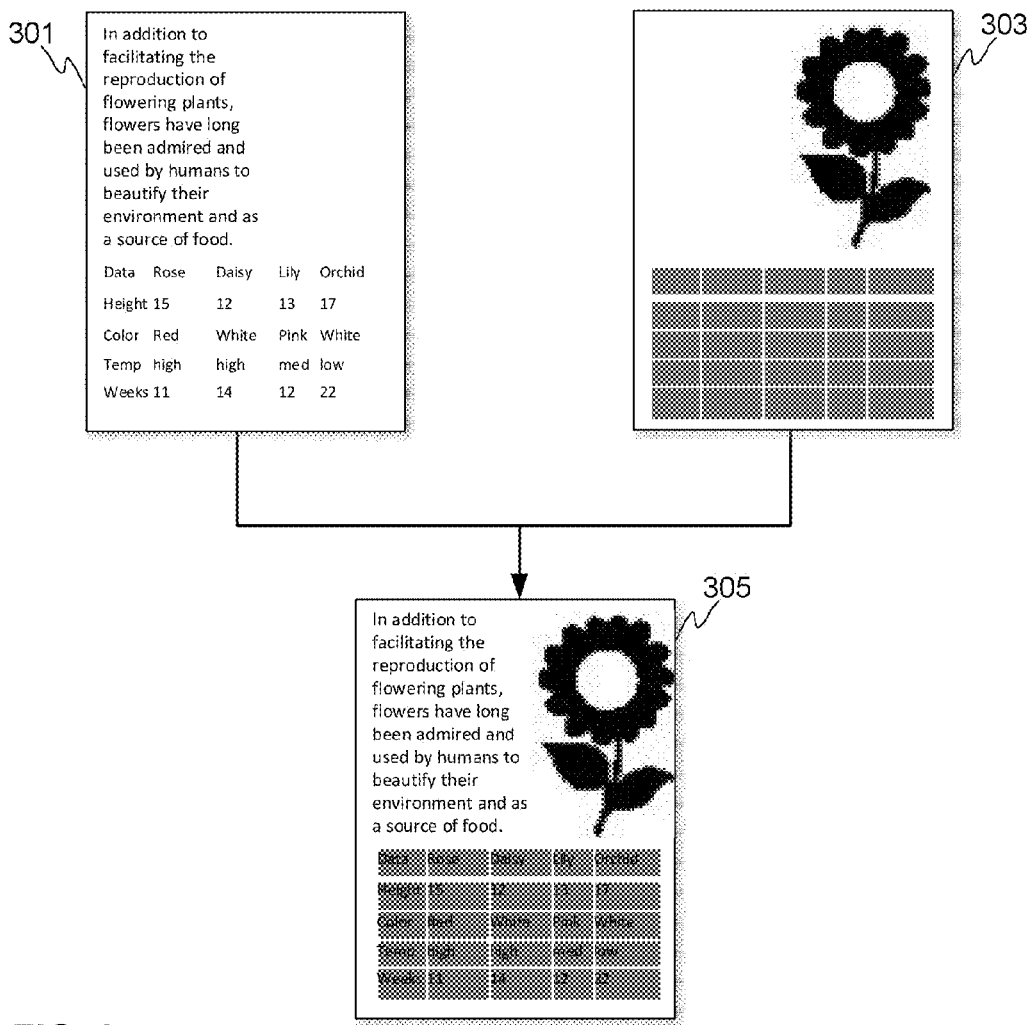
FIG. 3 illustrates a principle of an operation of the method according to an example of the invention.

FIG. 3 discloses the principle of the invention in an illustrative manner. Part of the final graphical presentation is textual content data 301, without any effects embedded in the text objects forming the textual content data 301. At least one other part is image content data 303, which comprises all visual objects except text without any effects. The mentioned content data are manipulated according to the method as described and the final graphical output is referred by 305. The final graphical output is displayed e.g. in a client device.

Figure 4:
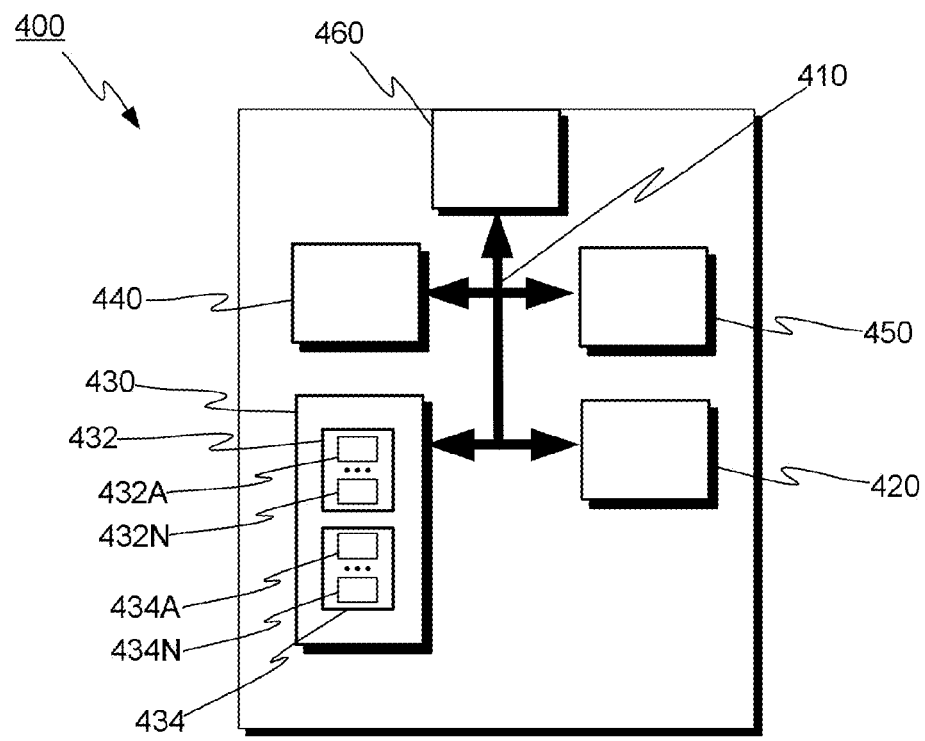
FIG. 4 illustrates a system according to an example of the invention.

The invention also relates to a system which is configured to implement the method as described above. A system according to an example of the invention is illustrated in FIG. 4. The system 400 comprises, for example, a bus 410, a processor 420, a memory 430, input means 440, output means 450, and a communication interface 460. The bus 410 may include means or methods that enable communication among the elements of the system 400. The system may comprise, or be implemented by, one or more servers, one or more desktop computers, one or more laptop computers, one or more tablet computers, one or more mobile communication terminals or one or more special hardware devices as long as it is capable of implementing the method according to the invention. Thus, in principle any computing device, which comprises necessary hardware and computer program code stored in a memory, may be configured to implement the method as described.

The processor 420 may comprise one or more conventional processors, one or more microprocessors, or one or more processing logics, or any combination of these, that interprets and executes instructions defined by portions of computer program code. The memory 430 may comprise a random access memory (RAM) 432 and/or a read only memory (ROM) 434. The RAM 432 may store information and instructions in a form of portions of computer program code 432A-432N for execution by the processor 420. The ROM 434 may include a conventional ROM device or another type of a static storage device that is configured to store static information and instructions in a form of portions of computer program code 434A-434N for use by the processor 420. The RAM 432 and ROM 434 may be implemented with one or more corresponding memory elements.

The input means 440 may comprise a conventional mechanism that permits inputting information to the system 400, such as a keyboard, a mouse, a pen, a touch screen, voice recognition and/or biometric mechanisms, CD/DVD/Blueray drive etc. The output means 450 may comprise a conventional mechanism that outputs information, including a display, a printer, a speaker, etc. The input and output means are not necessarily implemented into the system 400, but may be coupled to the system 400 with some known interfaces either wirelessly or in a wired manner when needed. In some examples of the invention the system does not comprise any input means 440 or output means 450 as the system operates as a standalone entity, which is controlled externally through the communication interface 460.

The communication interface 460 may enable the system 400 to communicate with other elements and/or systems, such as networks, as well as with client terminals either directly or indirectly over a network.

The system 400 may perform the operations as described above in response to the processor 420 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 460. The software instructions may cause the processor 420 to perform method steps and processes as described and thus to enable the operation of the system 400 according to an example of the invention.

As said, FIG. 4 illustrates an example of the system 400 according to the invention. The elements as disclosed in FIG. 4 do not necessarily exist in all implementations of the system 400. For example, the system 400 may not comprise input means 440 and output means 450, but the system 400 may be accessed through the communication interface 460 with applicable devices and systems. As well, the number and type of memories may vary. Further, the amount of portions of computer program code may depend on the implementation.

The system 400 is configured, by means of at least part of the mentioned elements, to implement the method according to an example of the invention. The system 400 may be any device that receives the content data as an input through e.g. the communication interface 460, performs the described method steps and returns or forwards the processed image content data further.

An example of the invention also relates to a computer-readable storage medium, which stores at least portions of computer program code, wherein the portions of computer program code are computer-executable to implement the method steps in the system as described.

Furthermore, the invention also relates to some aspects implemented in a client device. The client device is configured to be able to receive and downloading material from the Internet data sources. For example, if a user of the client terminal visits a web page, the client device is configured to receive the prepared content data e.g. with Internet browser residing and running in the client device. The prepared material here refers to content data prepared according to the method within the system as described. The material can be prepared prior to the visit in the web page or during the visit. According to some example of the invention the prepared content data, or at least part of it, may be chosen to be delivered to the client device on a basis of the characteristics of the client device. For example, the Hypertext Transfer Protocol (HTTP) identifies the client software originating the request using a "User-Agent" header. By identifying the client software, the system recognizes the client device. The system may query the characteristics of the client device from e.g. a database by means of the information. As a result the most appropriate content data for the client device is selected and transferred.

The received data files in the client device are at least one for image content data and one or more files for the textual content data. In this context the textual content data is received in three files i.e. HTML, web font files and CSS file. The software application in the client device is configured to detect the received files and it is arranged to detect that an image content file exists and thus provide the content data for a background. Furthermore, the software application is configured to read the compiling instructions from the received files relating to textual content in order to render the textual content within the client device.

In some example of the method according to the invention the content data may be delivered to the client device without any prior information on the type of the client device. For example, this may be arranged in such a manner that the rendition of the textual content data for the text layer is performed so that it is scaled according to a predetermined percentage with respect to a measure representing the web page, e.g. on the width. Thus, the server does not need to be aware of the characteristics of the client device.

The hardware characteristics of the client device relating to e.g. display resolution, display size, display shape, color profile of the display as well as any situation related information, such as a display orientation of the client device i.e. if the client device is either portraitly or landscapely oriented, in order to render the content data according to the display orientation may be taken into account. It is worthwhile to mention that the textual content data is to be re-rendered if e.g. display orientation of the client device changes during the displaying of the graphical representation and the maximum display width is desired.

Figure 5:
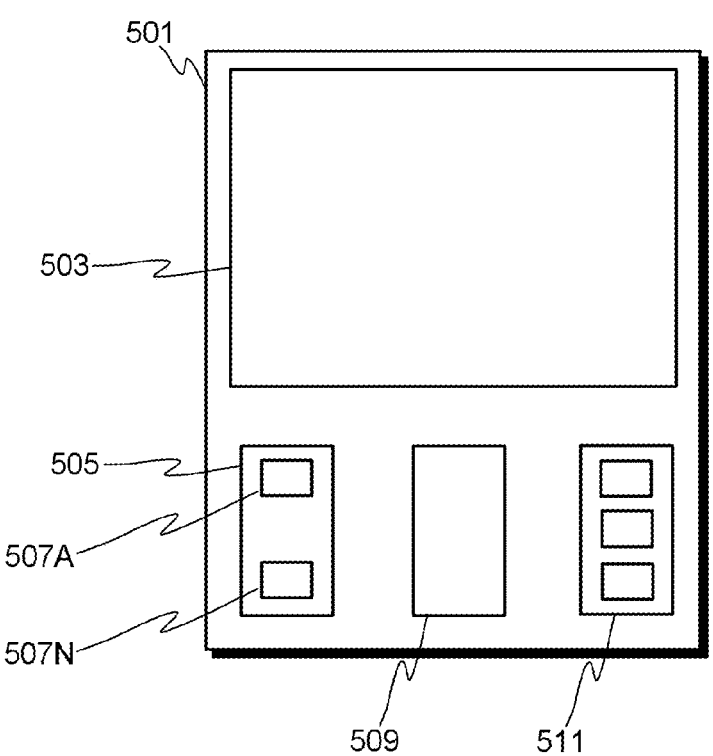
FIG. 5 illustrates a client device according to an example of the invention.

An example of a client device 501, which is configured to perform at least part of the rendition step, especially relating to textual content data for the text layer in the final graphical presentation, is illustrated in FIG. 5. The client device 501 comprises a display 503 for visualizing the final graphical presentation, one or more memories 505 of RAM or ROM type. The one or more memories 505 are configured to store portions of computer program code 507A-507N. Further, the client device 501 comprises one or more processors 509 and further I/O means, such as keyboard, one or more buttons, one or more microphones, one or more loudspeakers, one or more cameras and so on. The client device 501 also comprises communication interface in order to transmit and receive data to and from Internet and/or any other type of communication network.

The client device 501 is configured to prepare the content for displaying as described above. More specifically, the processor by executing the portions of computer program code is configured to cause the client device 501 to operate as disclosed.

It shall be mentioned here that FIG. 5 and the description above relating to the client device do not disclose all the necessary elements and the components needed to achieve the client device to operate as described. This is done for clarity reasons and only those elements are disclosed which play a central role when describing the current invention.

In the description above the invention idea is disclosed by applying the mechanism in a situation in which there is one or more image content items, which are to be categorized in one category and one or more textual content items, which are to be categorized in another category. The content data in the categories are configured to be at least partly manipulated so that the content of each of the category produces a content layer for the final graphical presentation. However, the inventive idea is not anyhow limited to categorizing the received content items into only two categories. For example, the image content items may be categorized in two or more categorizes on some predetermined basis, and thus producing more than one content layer designated for the final graphical presentation. This may require implementing some indicators to provide information for the outputting application in which order the different content layers are to be superposed. However, in case of two or more content layers the text layer is always to be superposed on topmost. The application software in the client device is configured to read any indicator relating to superposing order and implement the superposing accordingly. In case of one image layer and one text layer the superposing is configured to be performed on the basis of detecting the content data received in the client device i.e. image layer on the bottom and the textual content data is to be rendered on topmost.

Some advantageous embodiments according to the invention were described above. The invention is not limited to the embodiments described. The inventive idea can be applied in numerous ways within the scope defined by the claims attached hereto.

What is claimed is:

1. A computer implemented method for creating visual content originating from a document comprising a plurality of pages to be output in a layered manner, the method comprising:
   a) receiving a document that comprises at least one image content item and at least one textual content item;
   b) categorizing the at least one image content item into at least one first category, and the at least one textual content item into a second category representing textual content in the plurality of pages in the received document;
   c) manipulating image content data of the at least one image content item of the at least one first category with at least one operation applicable for image content, and creating at least one image data file comprising manipulated image data based on said manipulated image content data for at least one image layer for display on a client device;
   d) re-constructing the textual content items in the second category representing textual content in the plurality of pages in the received document into a single logical entity,
   e) manipulating re-constructed textual content data of the at least one textual content item of the second category representing textual content in the plurality of pages in the received document, comprising the sub-steps of:
      analyzing the re-constructed textual content data representing textual content in the plurality of pages in the received document re-constructed in the single logical entity, and creating web font variants for the textual content in the plurality of pages in the document for different software applications based on an output of said analyzing, and
      creating a text data file comprising manipulated textual content data for a text layer to be prepared for display on the client device; and
   f) storing the at least one image data file comprising the manipulated image data and the text data file comprising the manipulated textual content data.

2. The computer implemented method as claimed in claim 1, wherein the manipulation of the textual content data comprises a reconstruction of the textual content data to enable a further manipulation of the textual content data.

3. The computer implemented method as claimed in claim 2, wherein the reconstruction comprises a step of combining at least two separate text objects into a single logical text entity.

4. The computer implemented method as claimed in claim 1, wherein the manipulation of the textual content data comprises a step of selecting a font to be used in the text layer.

5. The computer implemented method as claimed in claim 4, wherein a font is selected, which is received as a font data within the at least one textual content item of the received document.

6. The computer implemented method as claimed in claim 4, wherein a font from a font pool available to the system is selected, which is a same as the font used in the at least one textual content item of the received document.

7. The computer implemented method as claimed in claim 4, wherein a most similar font to the font used in the at least one textual content item is selected from a font pool available to the system.

8. The computer implemented method as claimed in claim 1, wherein the manipulation of the textual content data comprises a step of creating multiple web font files for different application software outputting the textual data.

9. The computer implemented method as claimed in claim 1, wherein a textual content item with additional effects is categorized into the first category, and manipulated with at least one operation applicable for image content data.

10. A system for creating visual content originating from a document comprising a plurality of pages to be output in a layered manner, the system comprising:
    one or more processors; and
    a memory having stored therein computer program code executable by the one or more processors,
    the computer program code configured to, upon execution by the one or more processors, cause the system at least to:
    a) receive a document comprising at least one image content item and at least one textual content item,
    b) categorize the at least one image content item into at least one first category, and the at least one textual content item into a second category representing textual content in the plurality of pages in the received document,
c) manipulate image content data of the at least one image content item of the at least one first category with at least one operation applicable for image content, and creating at least one image data file comprising manipulated image data based on said manipulated image content data for at least one image layer for display on a client device,
d) re-construct the textual content items in the second category representing textual content in the plurality of pages in the received document into a single logical entity,
e) manipulate re-constructed textual content data of the at least one textual content item of the second category representing textual content in the plurality of pages in the received document, comprising the sub-steps of:
analyzing the re-constructed textual content data representing textual content in the plurality of pages in the received document re-constructed in the single logical entity, and creating web font variants for the textual content in the plurality of pages in the document for different software applications based on an output of said analyzing, and
creating a text data file comprising manipulated textual content data for a text layer to be prepared for display on the client device; and
f) store the at least one image data file comprising the manipulated image data and the text data file comprising the manipulated textual content data.

11. The system as claimed in claim 10, wherein the system is configured to reconstruct the textual content data to enable a further manipulation of the textual content data.

12. The system as claimed in claim 11, wherein the reconstruction comprises a step of combining at least two separate text objects into a single logical entity.

13. The system as claimed in claim 10, wherein the system is configured to select a font to be used in the text layer in the manipulation of the textual content data.

14. The system as claimed in claim 13, wherein the system is configured to select a font, which is received as a font data within the at least one textual content item of the received document.

15. The system as claimed in claim 13, wherein the system is configured to select a font from a font pool available to the system, which is a same as the font used in the at least one textual content item of the received document.

16. The system as claimed in claim 13, wherein the system is configured to select a most similar font to the font used in the at least one textual content item from a font pool available to the system.

17. The system as claimed in claim 10, wherein the system is configured to create multiple web font files for different application software outputting the textual content data in the manipulation of the textual data.

18. The system as claimed in claim 10, wherein the system is configured to categorize a textual content item with additional effects into the first category, and said text content item with additional effects is manipulated with at least one operation applicable for image content data.

19. A non-transitory computer-readable storage medium having stored thereon portions of computer-readable program code, wherein the portions of computer program code are sufficient to, upon execution by a processor device, implement the method steps of claim 1.

20. A method for creating visual content originating from a document comprising a plurality of pages to be output in a layered manner in a client device, the method comprising:
a) at the client device, receiving image data, prepared in a system according to claim 10, for at least one image layer;
b) at the client device, receiving one or more text data files, prepared in the system according to claim 10, comprising textual data for at least one text layer,
c) at the client device, rendering the received textual data at least partly based on hardware characteristics of the client device,
d) outputting the received image data and the rendered textual data in a layered manner as output on a display of the client device, wherein the textual data is set in a topmost layer in the output.

21. The method as claimed in claim 20, wherein the textual content data is re-rendered in response to a detection of a change in display orientation of the client device.

22. A client device for creating visual content originating from a document comprising a plurality of pages to be output in a layered manner in the client device, the client device comprising
one or more processors; and
a memory including computer program code,
the memory and the computer program code configured to, upon execution by the one or more processors, cause the client device at least to:
a) receive image content data, prepared in a system according to claim 10, for at least one image layer,
b) receive one or more text data files, prepared in the system according to claim 10, comprising textual data for at least one text layer,
c) render the received textual data at least partly on a basis of hardware characteristics of the client device,
d) output the received image data and the rendered textual data in a layered manner as output on a display of the client device, wherein the textual data is set in a topmost layer in the output.

* * * * *